United States Patent
Park et al.

(10) Patent No.: US 12,258,464 B2
(45) Date of Patent: Mar. 25, 2025

(54) POLYMER COMPOSITION FOR BLOW MOLDING INCLUDING WASTE SEPARATOR WITH INORGANIC COATING AND MOLDED ARTICLE MANUFACTURED THEREFROM

(71) Applicants: SK Innovation Co., Ltd., Seoul (KR); SK Geo Centric Co., Ltd., Seoul (KR)

(72) Inventors: Jong Sang Park, Daejeon (KR); Yun Bong Kim, Daejeon (KR); Kyu Young Cho, Daejeon (KR); Si Uk Cheon, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/327,170

(22) Filed: Jun. 1, 2023

(65) Prior Publication Data
US 2024/0059879 A1     Feb. 22, 2024

(30) Foreign Application Priority Data
Aug. 19, 2022     (KR) .................. 10-2022-0104050

(51) Int. Cl.
*C08L 23/06*     (2006.01)
*C08K 3/00*     (2018.01)

(52) U.S. Cl.
CPC ................ *C08L 23/06* (2013.01); *C08K 3/00* (2013.01); *C08L 2205/025* (2013.01); *C08L 2207/062* (2013.01); *C08L 2207/20* (2013.01)

(58) Field of Classification Search
CPC ............... C08L 23/06; C08L 2205/025; C08L 2207/062; C08L 2207/20; C08K 3/00
See application file for complete search history.

(56) References Cited

U.S. PATENT DOCUMENTS

2020/0010652 A1    1/2020   Brown

FOREIGN PATENT DOCUMENTS

| EP | 4245496 A1 | 9/2023 | |
| KR | 0166945 B1 | 3/1999 | |
| KR | 100593422 B1 | 6/2006 | |
| KR | 101669206 B1 | 10/2016 | |
| KR | 102323858 B1 | 11/2021 | |
| WO | 9119763 A1 | 12/1991 | |
| WO | 2016038110 A2 | 3/2016 | |
| WO | WO-2021074698 A1 * | 4/2021 | ......... B29C 49/0005 |

OTHER PUBLICATIONS

KR 102323858 machine translation (Year: 2020).*

* cited by examiner

*Primary Examiner* — Robert S Jones, Jr.
*Assistant Examiner* — Jiangtian Xu
(74) *Attorney, Agent, or Firm* — The Webb Law Firm

(57) ABSTRACT

Provided is a polymer composition for blow molding which includes a high-density polyethylene recovered from a secondary battery separator and has excellent mechanical properties. The polymer composition having excellent processability may be prepared by recycling a secondary battery separator, and may be molded to manufacture an environmental small to medium sized container which has excellent mechanical properties such as flexural strength, elongation, and impact strength in a large temperature range and has excellent processing moldability.

15 Claims, No Drawings

POLYMER COMPOSITION FOR BLOW MOLDING INCLUDING WASTE SEPARATOR WITH INORGANIC COATING AND MOLDED ARTICLE MANUFACTURED THEREFROM

CROSS-REFERENCE TO RELATED APPLICATION

This application claims priority to Korean Patent Application No. 10-2022-0104050, filed on Aug. 19, 2022, the disclosure of which is hereby incorporated by reference in its entirety.

BACKGROUND OF THE INVENTION

Field of the Invention

The following disclosure relates to a polymer composition for blow molding comprising a waste separator comprising an inorganic coating, and a molded article manufactured therefrom.

Description of Related Art

As the use of a secondary battery becomes popular, the amount of waste secondary batteries which are discarded at the end of their lifespan is increasing. Thus, various methods for recycling waste secondary batteries are being studied, and for example, pre-processing work including recovering, discharging, crushing, and sorting waste secondary batteries is performed, thereby classifying an outer can, a separator, negative/positive electrodes, and the like, and then recovering metal such as cobalt, nickel, lithium and manganese.

However, waste separators recycled from the waste secondary batteries, waste separators produced from defective products, or separator scraps produced during a manufacturing process are not recycled and are treated by an inappropriate method such as overseas export after incineration or crushing, and thus, have been pointed out as a cause of environmental pollution. As plastic decomposes by exposure to sunlight and heat, the plastic waste releases greenhouse gases such as methane and ethylene. Incineration of plastic waste releases significant amounts of greenhouse gases (GHG), such as carbon dioxide, nitrous oxide and/or methane, into the environment. Carbon dioxide is the primary greenhouse gas contributing to climate change.

Thus, in order to solve the problems, various efforts to recycle waste separators are being made, but due to poor physical properties of the recycled waste separators, such as poor environmental stress crack resistance, insignificant elongation and flexural strength, and low melt index, their processability is not good, and thus, it is difficult to mold the waste separators.

In particular, most of the recently produced separators for an automotive secondary battery are coated with ceramic for improving thermal resistance. However, when the ceramic-coated waste separator is recycled and included in a polymer composition for molding, physical properties such as elongation or impact strength are greatly decreased due to the influence of the ceramic, and it takes extra time and money to solve the problem, and a pre-processing process to remove ceramic should be carried out.

Therefore, research and development on an environmentally friendly polymer composition for molding which may recycle a ceramic-coated waste separator without an additional pre-processing process, may be molded in various forms due to its excellent processability, and implement excellent mechanical properties is needed.

SUMMARY OF THE INVENTION

An embodiment of the present invention is directed to providing a polymer composition for blow molding comprising a waste separator comprising an inorganic coating which does not undergo a separate pre-processing process.

Another embodiment of the present invention is directed to providing an environmentally friendly polymer composition for blow molding which shows mechanical properties such as melt flow index, elongation, flexural strength, and impact strength which are preferred in blow molding, despite comprising more than a certain content of waste high-density polyethylene, and a molded article manufactured therefrom.

Still another embodiment of the present invention is directed to providing a method of preparing a polymer composition for blow molding which comprises an inorganic content within a certain numerical range and a melt flow index preferred in blow molding by adjusting the physical properties and the contents of a waste separator without an inorganic coating and a new high-density polyethylene depending on the inorganic content of a waste separator comprising an inorganic coating.

In order to achieve the above objects, endless research to prepare an environmentally friendly polymer composition for molding which may recycle a ceramic-coated waste separator without an additional pre-processing process and implement excellent processability and excellent mechanical properties was developed, and as a result, it was found that when a new high-density polyethylene satisfying certain conditions is included and an inorganic content satisfies a certain content with respect to the total weight of the polymer composition, a polymer composition, which, though comprising a certain content or more of waste high-density polyethylene, has a melt flow index preferred in blow molding to have excellent processing moldability, and shows excellent mechanical properties such as elongation, flexural strength, and impact strength, may be prepared, thereby providing the present invention.

In one general aspect, a polymer composition for blow molding comprises: a waste high-density polyethylene comprising a waste separator comprising an inorganic coating; and a new high-density polyethylene having a melt flow index of 0.01 to 5 g/10 min as measured in accordance with ASTM D1238 (190° C., 2.16 kg), wherein an inorganic content derived from the waste separator comprising the inorganic coating is 20 wt % or less with respect to the total weight of the polymer composition for blow molding.

In the polymer composition for blow molding according to an exemplary embodiment, the inorganic content derived from the waste separator comprising the inorganic coating may be 3 to 10 wt % with respect to the total weight of the polymer composition for blow molding.

In the polymer composition for blow molding according to an exemplary embodiment, the waste high-density polyethylene may further comprise a waste separator without an inorganic coating, and the waste separator without the inorganic coating may be further input or included in the composition in an amount to adjust an inorganic content of the polymer composition for blow molding.

In the polymer composition for blow molding according to an exemplary embodiment, a melt flow index of the waste high-density polyethylene ($MI_1$) and a melt flow index of the new high-density polyethylene ($MI_2$) may satisfy the following Equation 1, and the melt flow index may be measured in accordance with ASTM D1238 (190° C., 2.16 kg):

$$-4.3 \leq \log(MI_1)+2\times\log(MI_2) \leq -0.9 \qquad \text{[Equation 1]}$$

In the polymer composition for blow molding according to an exemplary embodiment, the waste high-density polyethylene may have the melt flow index (HLMI$_1$) of 0.1 to 7.0 g/10 min as measured in accordance with ASTM D1238 (190° C., 21.6 kg).

In the polymer composition for blow molding according to an exemplary embodiment, the new high-density polyethylene may have the melt flow index (MI$_2$) of 0.1 to 2 g/10 min as measured in accordance with ASTM D1238 (190° C., 2.16 kg).

In the polymer composition for blow molding according to an exemplary embodiment, the waste separator comprising the inorganic coating and the waste separator without the inorganic coating may satisfy a weight ratio of 1:0.5 to 10.

In the polymer composition for blow molding according to an exemplary embodiment, the waste high-density polyethylene may be comprised at 30 to 50 wt % with respect to the total weight of the polymer composition for blow molding.

In the polymer composition for blow molding according to an exemplary embodiment, the waste high-density polyethylene and the new high-density polyethylene may satisfy a weight ratio of 1:1 to 3.

In the polymer composition for blow molding according to an exemplary embodiment, the waste separator may be any one or two or more waste separator(s) selected from waste separators recycled from waste secondary batteries and secondary battery defective products, scraps produced in a secondary battery separator manufacturing process, and separator ends recovered after trimming.

In the polymer composition for blow molding according to an exemplary embodiment, the polymer composition for blow molding may have a melt flow index (MI$_3$) of 0.05 to 1.0 g/10 min as measured in accordance with ASTM D1238 (190° C., 2.16 kg).

In the polymer composition for blow molding according to an exemplary embodiment, the polymer composition for blow molding may have a tensile strength at yield of 220 kg/cm$^2$ or more and an elongation of 300% or more.

In the polymer composition for blow molding according to an exemplary embodiment, the polymer composition for blow molding may have an Izod impact strength of 10 kJ/m$^2$ or more as measured at a temperature of 23±2° C. and a flexural strength of 9,000 kgf/cm$^2$ or more.

In the polymer composition for blow molding according to an exemplary embodiment, the polymer composition for blow molding may have an environmental stress crack resistance of 10 hours or more as measured in accordance with ASTM D1693.

In another general aspect, a pellet for molding comprises the polymer composition for blow molding described above.

In another general aspect, a molded article manufactured by blow molding the polymer composition for blow molding described above is provided.

In still another general aspect, a method of preparing a polymer composition for blow molding obtained by recycling a waste separator comprises:

(a) measuring an inorganic content in a waste separator comprising an inorganic coating;

(b) in a polymer composition for blow molding comprising a waste high-density polyethylene comprising a waste separator comprising an inorganic coating and a waste separator without an inorganic coating; and a new high-density polyethylene:

adjusting each content so that the inorganic content derived from the waste separator comprising the inorganic coating is 3 to 10 wt % with respect to the total weight of the polymer composition for blow molding, and selecting the new high-density polyethylene satisfying the following Equation 1; and (c) mixing the waste high-density polyethylene and the new high-density polyethylene to prepare the polymer composition for blow molding:

$$-4.3 \leq \log(MI_1)+2\times\log(MI_2) \leq -0.9 \qquad \text{[Equation 1]}$$

wherein

MI$_1$ and MI$_2$ are a melt flow index of the waste high-density polyethylene (MI$_1$) and a melt flow index of the new high-density polyethylene (MI$_2$) as measured in accordance with ASTM D1238 (190° C., 2.16 kg).

In the method of preparing a polymer composition for blow molding obtained by recycling a waste separator, step (c) may comprise mixing the waste separator comprising an inorganic coating, the waste separator without an inorganic coating, and the new high-density polyethylene in one place to prepare a pellet.

In the method of preparing a polymer composition for blow molding obtained by recycling a waste separator, the step (c) may comprise mixing the waste separator comprising the inorganic coating and the waste separator without the inorganic coating to prepare a first pellet and then mixing the first pellet and the new high-density polyethylene.

A method for reducing greenhouse gas emissions from a waste secondary battery separator is provided, comprising: obtaining a waste separator comprising an inorganic coating from a waste secondary battery separator as a recycled feedstock material for manufacturing a container; combining the waste separator comprising the inorganic coating with a new high-density polyethylene having a melt flow index of 0.01 to 5 g/10 min as measured in accordance with ASTM D1238 (190° C., 2.16 kg) to form a mixture; and molding the mixture to form a container.

Other features and aspects will be apparent from the following detailed description, the drawings, and the claims.

DESCRIPTION OF THE INVENTION

Hereinafter, the present disclosure will be described in more detail. However, the following examples or exemplary embodiments are only a reference for describing the present disclosure in detail, and the present disclosure is not limited thereto and may be implemented in various forms.

In addition, unless otherwise defined, all technical terms and scientific terms have the same meanings as those commonly understood by one of those skilled in the art to which the present disclosure pertains.

The terms used for description in the present specification are only for effectively describing a certain specific exemplary embodiment, and are not intended to limit the present disclosure.

In addition, the singular form used in the specification and claims appended thereto may be intended to include a plural form also, unless otherwise indicated in the context. As used herein, the singular form of "a", "an", and "the" include plural referents unless the context clearly states otherwise.

For the purposes of this specification, unless otherwise indicated, all numbers expressing quantities of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

In addition, units used in the present specification without particular mention are based on weights, and as an example, a unit of % or ratio refers to a wt % or a weight ratio and wt % refers to wt % of any one component in a total composition, unless otherwise defined.

In addition, unless particularly described to the contrary, "comprising" any elements will be understood to imply further inclusion of other elements rather than the exclusion of any other elements.

In addition, the numerical range used in the present specification may include all values within the range including the lower limit and the upper limit, increments logically derived in a form and span in a defined range, all double limited values, and all possible combinations of the upper limit and the lower limit in the numerical range defined in different forms. Unless otherwise particularly defined in the present specification, values which may be outside a numerical range due to experimental error or rounding of a value are also included in the defined numerical range. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

Hereinafter, the present disclosure will be described in more detail.

The present disclosure provides a polymer composition for blow molding comprising: a waste high-density polyethylene comprising a waste separator comprising an inorganic coating; and a new high-density polyethylene having a melt flow index of 0.01 to 5 g/10 min as measured in accordance with ASTM D1238 (190° C., 2.16 kg), wherein an inorganic content derived from the waste separator comprising the inorganic coating is 20 wt % or less with respect to the total weight of the polymer composition for blow molding.

In the polymer composition for blow molding according to an exemplary embodiment, the waste high-density polyethylene may comprise the waste separator with the inorganic coating and a waste separator without an inorganic coating. The waste separator without the inorganic coating may be input or added to the polymer composition for blow molding for adjusting the inorganic content, and the content of the input waste separator without the inorganic coating may be easily adjusted by the content of the waste high-density polyethylene, the inorganic content of the waste separator with the inorganic coating, and the like.

In the polymer composition for blow molding according to an exemplary embodiment, the waste separator with the inorganic coating may have an inorganic content of 1 to 99 wt %, or 5 to 90 wt %, or 30 to 80 wt %, and the waste separator without the inorganic coating may not substantially comprise an inorganic material, and substantially not comprising an inorganic material may refer to having less than 1 wt % of an inorganic content, but is not limited thereto. The inorganic material may be ceramic, and a non-limiting example thereof may comprise one or more selected from $SiO_2$, $Al_2O_3$, $TiO_2$, $SnO_2$, $CeO_2$, $ZrO_2$, $BaTiO_3$, $Y_2O_3$, and the like, and combination(s) thereof.

In the polymer composition for blow molding according to an exemplary embodiment, the waste high-density polyethylene may comprise the waste separator comprising an inorganic coating and the waste separator without the inorganic coating at a weight ratio of 1:0.1 to 10, or 1:0.3 to 7, or 1:0.5 to 5. When the range is satisfied, the inorganic content derived from the waste separator with the inorganic coating with respect to the total weight of the polymer composition for blow molding may be efficiently adjusted.

In the polymer composition for blow molding according to an exemplary embodiment, the waste high-density polyethylene may comprise 20 wt % or more, or 30 wt % or more, or 30 to 50 wt % with respect to the total weight of the polymer composition for blow molding. In general, as the higher content of the waste high-density polyethylene is included, environmental friendliness may be secured more easily, but melt flow index or mechanical properties are deteriorated. Though the polymer composition for blow molding according to an exemplary embodiment comprises 30 wt % or more of the waste high-density polyethylene, it may have a melt flow index preferred in blow molding, and furthermore, a molded article manufactured therefrom may implement excellent mechanical properties such as elongation and impact strength.

In the polymer composition for blow molding according to an exemplary embodiment, the waste separator with the inorganic coating or the waste separator without the inorganic coating may comprise one or two or more waste separators selected from waste separators recovered from waste secondary batteries and secondary battery defective products, scraps produced in a secondary battery separator manufacturing process, and separator ends recovered after trimming, but is not limited thereto. In addition, the waste high-density polyethylene may be used without great limitation as long as it is a discarded material such as scraps obtained during manufacture for the use of a separator or is a high-density polyethylene of a waste separator recycled from a waste secondary battery as described above.

In the polymer composition for blow molding according to an exemplary embodiment, the waste high-density polyethylene may have a weight average molecular weight (Mw) of 50,000 to 2,000,000 g/mol, or 80,000 to 1,500,000 g/mol, or 100,000 to 1,000,000 g/mol, a number average molecular weight (Mn) of 50,000 to 1,000,000 g/mol, or 50,000 to 1,000,000 g/mol, or 50,000 to 1,000,000 g/mol, and/or a polydispersity index (PDI) of 1 to 50, or 1.5 to 20, or 3 to 10, but is not limited thereto.

In the polymer composition for blow molding according to an exemplary embodiment, the waste high-density polyethylene may have a melt flow index ($HLMI_1$) of 0.1 to 10.0 g/10 min, or 0.1 to 7.0 g/10 min, or 0.2 to 5.0 g/10 min, as measured in accordance with ASTM D1238 (190° C., 21.6 kg). A melt flow index ($MI_1$) measured under a load condition of 2.16 kg may be 0.001 to 0.5 g/10 min, or 0.005 to 0.10 g/10 min. The polymer composition according to an exemplary embodiment, though comprising a waste high-density polyethylene having the melt flow index in the above range, may implement the melt flow index appropriate for blow molding.

In the polymer composition for blow molding according to an exemplary embodiment, the waste high-density polyethylene may have a density of 0.9 to 2.5 g/cm$^3$, or 0.93 to 2.20 g/cm$^3$, or 0.94 to 2.0 g/cm$^3$.

In the polymer composition for blow molding according to an exemplary embodiment, the waste high-density polyethylene may have a melting point ($T_m$) of 100° C. or higher, or 120° C. or higher, or 130° C. or higher, and though the upper limit is not particularly limited, may have a melting point of 200° C. or lower.

In the polymer composition for blow molding according to an exemplary embodiment, the waste high-density polyethylene may have a tensile strength at yield of 100 to 550 kgf/cm$^2$, or 200 to 400 kgf/cm$^2$, but is not limited thereto.

In the polymer composition for blow molding according to an exemplary embodiment, the waste high-density polyethylene may have an elongation at break of 1 to 2000%, or 10 to 1000%, but is not limited thereto.

In the polymer composition for blow molding according to an exemplary embodiment, the waste high-density polyethylene may have a flexural strength of 2,000 to 25,000 kgf/cm$^2$, or 3,000 to 20,000 kgf/cm$^2$, but is not limited thereto.

In the polymer composition for blow molding according to an exemplary embodiment, the waste high-density polyethylene may have an Izod impact strength at room temperature (23±2° C.) of 5 kJ/m$^2$ or more, or 10 kJ/m$^2$ or more. The upper limit is not particularly limited, and for example, may be 200 kJ/m$^2$ or less, but is not limited thereto.

In the polymer composition for blow molding according to an exemplary embodiment, the waste high-density polyethylene may have an environmental stress crack resistance (ESCR) of 10 hours or more, or 20 hours or more. The upper limit is not particularly limited, and for example, may be 10000 hours or less, but is not limited thereto.

In the polymer composition for blow molding according to an exemplary embodiment, the new high-density polyethylene may have a weight average molecular weight (Mw) of 50,000 to 500,000 g/mol, or 80,000 to 400,000 g/mol, or 100,000 to 300,000 g/mol, and/or a number average molecular weight (Mn) of 5,000 to 250,000 g/mol, or 7,000 to 200,000 g/mol, or 10,000 to 150,000 g/mol, but is not limited thereto, and commercially available products may be used.

In the polymer composition for blow molding according to an exemplary embodiment, a melt flow index of the waste high-density polyethylene (MI$_1$) and a melt flow index of the new high-density polyethylene (MI$_2$) may satisfy the following Equation 1, or Equation 1-1. Herein, the melt flow index may be measured in accordance with ASTM D1238 (190° C., 2.16 kg):

$$-4.3 \leq \log(MI_1) + 2 \times \log(MI_2) \leq -0.9 \quad \text{[Equation 1]}$$

$$-3.3 \leq \log(MI_1) + 2 \times \log(MI_2) \leq -1.6 \quad \text{[Equation 1-1]}$$

The polymer composition comprising the waste high-density polyethylene and the new high-density polyethylene satisfying Equation 1, or Equation 1-1, may show a melt flow index appropriate for blow molding, thereby implementing more improved work efficiency and low defect rate.

In addition, the new high-density polyethylene is not largely limited as long as it has the melt flow index (MI$_2$) which is measured in accordance with ASTM D1238 (190° C., 2.16 kg) and satisfies Equation 1, or Equation 1-1, but MI$_2$ may be 0.1 to 5 g/10 min, or 0.1 to 2 g/10 min, or 0.1 to 1.5 g/10 min. Alternatively, MI$_2$ may be 0.4 to 1.5 g/10 min. In addition, a melt flow index (HLMI$_2$) measured under a load condition of 21.6 kg may be 5 to 70 g/10 min, or 10 to 50 g/10 min.

In the polymer composition for blow molding according to an exemplary embodiment, the new high-density polyethylene may have a density of 0.930 to 0.970 g/cm$^3$, or 0.940 to 0.970 g/cm$^3$.

In the polymer composition for blow molding according to an exemplary embodiment, the new high-density polyethylene may have a polydispersity index (PDI, Mw/Mn) of 2 or more, or 3 or more, but is not limited thereto, and may be 20 or less.

In the polymer composition for blow molding according to an exemplary embodiment, the new high-density polyethylene may have a melting point ($T_m$) of 100° C. or higher, or 120° C. or higher, or 130° C. or higher, but is not limited thereto, and may have a melting point ($T_m$) of 200° C. or lower.

In the polymer composition for blow molding according to an exemplary embodiment, the new high-density polyethylene may have a tensile strength at yield of 100 to 500 kgf/cm$^2$, or 200 to 400 kgf/cm$^2$, or 220 to 350 kgf/cm$^2$, but is not limited thereto.

In the polymer composition for blow molding according to an exemplary embodiment, the new high-density polyethylene may have an elongation at break of 300 to 3000%, or 500 to 2000%, but is not limited thereto.

In the polymer composition for blow molding according to an exemplary embodiment, the new high-density polyethylene may have an Izod impact strength at room temperature (23±2° C.) of 1 kJ/m$^2$ or more, or 5 to 50 kJ/m$^2$, but is not limited thereto.

In the polymer composition for blow molding according to an exemplary embodiment, the new high-density polyethylene may have a flexural strength of 5000 to 20000 kgf/cm$^2$, or 7000 to 17000 kgf/cm$^2$, or 9000 to 15000 kgf/cm$^2$, or 10000 to 15000 kgf/cm$^2$, but is not limited thereto.

In the polymer composition for blow molding according to an exemplary embodiment, the new high-density polyethylene may have an environmental stress crack resistance (ESCR) of 5 hours or more, or 10 hours or more, and the upper limit is not particularly limited.

In the polymer composition for blow molding according to an exemplary embodiment, the polymer composition for blow molding including the new high-density polyethylene satisfying the physical properties described above may have suppressed occurrence of fine powder or fume to implement excellent process stability, and though comprising a significant amount of the waste high-density polyethylene comprising the waste separator with the inorganic coating, it shows a melt flow index preferred in blow molding to have more improved work efficiency, and it may produce an environmentally friendly molded article having excellent mechanical properties such as elongation, impact strength, and flexural strength.

Conventionally, a polyethylene was used alone or in combination with other polyethylenes for recycling the waste high-density polyethylene of the waste separator, but when the polyethylene is included in excess, a low melt flow index and insignificant mechanical properties are problematic. In order to solve the problems, in the present disclosure, it was found that when a new polyethylene satisfying certain conditions is applied, mechanical properties and processability which are appropriate for blow molding are shown, and thus, the present invention has been provided.

In the polymer composition for blow molding according to an exemplary embodiment, the waste high-density polyethylene and the new high-density polyethylene may satisfy a weight ratio of 1:0.5 to 5, or 1:1 to 3.

Alternatively, the polymer composition for blow molding according to an exemplary embodiment may comprise 20 to 60 wt % of the waste high-density polyethylene and 40 to 80 wt % of the new high-density polyethylene, or 30 to 50 wt % of the waste high-density polyethylene and 50 to 70 wt % of the new high-density polyethylene.

When the range described above is satisfied, the polymer composition shows a melt flow index appropriate for blow molding to have excellent work efficiency during blow molding and decreased occurrence of fine powder or fume to implement excellent process stability, and may produce a molded article having improved mechanical physical properties. Furthermore, as the content of the waste high-density polyethylene is increased, recycling efficiency is increased, and thus, environmental friendliness may be implemented more effectively.

Specifically, in the polymer composition for blow molding according to an exemplary embodiment, the inorganic content derived from the waste separator with an inorganic coating may be 3 to 15 wt %, or 3 to 10 wt % with respect to the total weight of the polymer composition for blow molding. When the range described above is satisfied, the polymer composition for blow molding, though comprising a waste separator with the inorganic coating, may show a melt flow index appropriate for blow molding and also effectively implement excellent mechanical properties such as elongation, impact strength, and flexural strength.

In the polymer composition for blow molding according to an exemplary embodiment, the polymer composition for blow molding may have a density of 0.9 to 1.5 g/cm$^3$, or 0.93 to 1.3 g/cm$^3$, or 0.94 to 1.1 g/cm$^3$.

In the polymer composition for blow molding according to an exemplary embodiment, the polymer composition for blow molding may have a melt flow index (MI$_3$) of 0.05 to 1.0 g/10 min, or 0.1 to 0.5 g/10 min as measured in accordance with ASTM D1238 (190° C., 2.16 kg). In addition, a melt flow index (HLMI$_3$) measured under a load condition of 21.6 kg may be 5 to 30 g/10 min, or 10 to 20 g/10 min. When the range is satisfied, appropriate processability is imparted during blow molding, thereby implementing more improved work efficiency and a low defective rate.

In the polymer composition for blow molding according to an exemplary embodiment, the polymer composition for blow molding may have a tensile strength at yield of 180 kg/cm$^2$ or more, or 200 kg/cm$^2$ or more, or 220 kg/cm$^2$ or more, and though the upper limit is not particularly limited, may have a tensile strength at yield of 400 kg/cm$^2$ or less. In addition, the polymer composition for blow molding may have an elongation at break of 300% or more, or 400% or more, or 500% or more, and though the upper limit is not particularly limited, may have an elongation of 2000% or less.

In the polymer composition for blow molding according to an exemplary embodiment, the polymer composition for blow molding may have an Izod impact strength measured at a temperature of 23±2° C. of 3 kJ/m$^2$ or more, or 5 kJ/m$^2$ or more, or 10 to 50 kJ/m$^2$, and a flexural strength of 9,000 kgf/cm$^2$ or more, or 10,000 to 20,000 kgf/cm$^2$, or 10,000 to 15,000 kgf/cm$^2$.

In the polymer composition for blow molding according to an exemplary embodiment, the polymer composition for blow molding may have an environmental stress crack resistance measured in accordance with ASTM D1693 of 10 hours or more, or 20 hours or more, and though the upper limit is not largely limited, for example, may have an environmental stress crack resistance of 10000 hours or less.

In the polymer composition for blow molding according to an exemplary embodiment, the polymer composition for blow molding may further comprise an additive commonly used in the art, depending on the purpose and the use. For example, the polymer composition may further comprise an antioxidant, a UV absorber, a UV stabilizer, a lubricant, a pigment, a colorant, a filler, a plasticizer, a flow agent, an antistatic agent, a flame retardant, a slap agent, an antiblock agent, and the like, and the additive may be included at an appropriate content within a range which does not impair the targeted physical properties.

The UV absorber may be a benzotriazine-based or benzotriazole-based UV absorber, and further, may be mixed with a HALS-based UV stabilizer or primary and secondary antioxidants such as dibutylhydroxytoluene, nonylphenylphosphite, and dibutylmethylpheno, but the kind and the content thereof are not particularly limited as long as the targeted physical properties are not impaired.

Non-limiting examples of the benzotriazole-based UV absorber may comprise 2-(2'-hydroxymethylphenyl)benzotriazole, 2-(2'-hydroxy-3',5'-bis(α,α-dimethylbenzylphenyl))benzotriazole, 2-(2'-hydroxy-3',5'-dibutylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, and the like, and the benzotriazine-based UV absorber may be, for example, bis-ethylhexyloxyphenolmethoxyphenyl triazine, and the like, but is not limited thereto.

In addition, the lubricant serves to improve flowability during profile extrusion and suppress frictional heat, and may be a combination of one or more selected from hydrocarbon-based, carboxylic acid-based, alcohol-based, amide-based, ester-based compounds, mixtures thereof, and the like, but the kind and the content thereof are not particularly limited as long as the targeted physical properties are not impaired.

The present disclosure may provide a pellet for molding comprising the polymer composition for blow molding described above. The pellet refers to a form cut into a uniform size before manufacturing a molded article, and may be manufactured by a common known method such as extrusion and injection. In addition, the size and the shape of the pellet are not limited, and may further comprise commonly used known additive(s).

The present disclosure may provide a molded article manufactured by blow molding the polymer composition for blow molding described above. Blow molding may be performed by a commonly used or known method. The molded article may be a molded article such as a low volume container, a container for storage or preservation, an airtight container, or a packaging container, but is not limited thereto. The molded article according to an exemplary embodiment has excellent physical properties such as tensile strength at yield, elongation, flexural strength, impact strength, and/or ESCR and is appropriate for being applied to products in various industrial fields, and most of all, has excellent environmental friendliness in that it is manufactured by recycling the secondary battery waste recycled from the secondary battery.

Hereinafter, a method of preparing a polymer composition for blow molding obtained by recycling a waste separator according to an exemplary embodiment will be described in more detail.

The present disclosure provides a method of preparing a polymer composition for blow molding obtained by recycling a waste separator comprising:

(a) measuring an inorganic content in a waste separator with an inorganic coating;

(b) in a polymer composition for blow molding comprising a waste high-density polyethylene comprising a waste separator with an inorganic coating and a waste separator without an inorganic coating; and a new high-density polyethylene, adjusting each content so that the inorganic content derived from the waste separator with the inorganic coating is 3 to 10 wt % with respect to the total weight of the polymer composition for blow molding, and selecting the new high-density polyethylene satisfying the following Equation 1; and (c) mixing the waste high-density polyethylene and the new high-density polyethylene to prepare the polymer composition for blow molding:

$$-4.3 \leq \log(MI_1) + 2 \times \log(MI_2) \leq -0.9 \quad \text{[Equation 1]}$$

wherein $MI_1$ and $MI_2$ are a melt flow index of the waste high-density polyethylene ($MI_1$) and a melt flow index of the new high-density polyethylene ($MI_2$) as measured in accordance with ASTM D1238 (190° C., 2.16 kg).

In the method of preparing a polymer composition for blow molding obtained by recycling the waste separator according to an exemplary embodiment, step (a) may be performed by an analysis method or a known method which is commonly used for analyzing the inorganic content. The results of analyzing the inorganic content of the waste separator with the inorganic coating may be the same or different from the inorganic content of the waste high-density polyethylene described above, but are not limited thereto.

In the method of preparing a polymer composition for blow molding obtained by recycling a waste separator according to an exemplary embodiment, step (b) is a step of adjusting the contents of the waste separator with the inorganic coating, the waste separator without the inorganic coating, and the new high-density polyethylene, and a new high-density polyethylene having appropriate physical properties is selected, and the contents of the waste separator without the inorganic coating and the new high-density polyethylene may be adjusted by the inorganic content of the waste separator with the inorganic coating measured in step (a) before.

Specifically, a new high-density polyethylene having a melt flow index satisfying Equation 1 is selected, and the content of the waste separator with the inorganic coating in the waste high-density polyethylene and a weight ratio of the waste high-density polyethylene and the new high-density polyethylene may be adjusted so that the inorganic content derived from the waste separator with the inorganic coating satisfies a range of 3 to 10 wt % with respect to the total weight of the polymer composition for blow molding. The method of preparing a polymer composition for blow molding obtained by recycling a waste separator according to an exemplary embodiment may comprise the waste high-density polyethylene comprising a certain content or more of the waste separator with an inorganic coating to easily secure environmental friendliness, and the polymer composition is prepared by the above steps, thereby effectively implementing the melt flow index and mechanical properties appropriate for blow molding.

In the method of preparing a polymer composition for blow molding obtained by recycling a waste separator according to an exemplary embodiment, steps (a) and (b) may be performed by an automated system. For more efficient process execution, measurement of the inorganic content of the waste separator with the inorganic coating, selection of the new high-density polyethylene, and a process of adjusting the contents of raw materials may be performed by the automated system so that they satisfy the conditions described above.

In the method of preparing a polymer composition for blow molding obtained by recycling a waste separator according to an exemplary embodiment, step (c) is a step of inputting raw materials selected in step (b) according to their contents to prepare a polymer composition, and may be performed by a common method or a known blending method. As a non-limiting example, the raw materials may be blended using an extruder, a roll mill, a Banbury mixer, a kneader, and the like.

The raw materials may comprise the waste separator with the inorganic coating, the waste separator without the inorganic coating, and the new high-density polyethylene described above, and the raw materials may be mixed in one place to prepare a pellet according to an exemplary embodiment.

According to another exemplary embodiment, a step of mixing the waste separator with the inorganic coating and the waste separator without the inorganic coating to prepare a first pellet, and then mixing the first pellet and the new high-density polyethylene may be further included. When the raw materials are blended or melt kneaded in a plurality of steps, a waste separator may be input in a larger amount to prepare a polymer composition.

A method for reducing greenhouse gas emissions from a waste secondary battery separator is provided, comprising: obtaining a waste separator comprising an inorganic coating from a waste secondary battery separator as a recycled feedstock material for manufacturing a container; combining the waste separator comprising the inorganic coating with a new high-density polyethylene having a melt flow index of 0.01 to 5 g/10 min as measured in accordance with ASTM D1238 (190° C., 2.16 kg) to form a mixture; and molding the mixture to form a container. By using the waste separator comprising an inorganic coating from a waste secondary battery separator as a recycled feedstock material, this waste material is recycled and it is not treated by inappropriate methods such as incineration or shredding, which can release greenhouse gases such as carbon dioxide, nitrous oxide and/or methane into the environment when the plastic decomposes by exposure to sunlight and heat or by incineration. By avoiding the release of greenhouse gases, recycling of this material can reduce greenhouse gas emissions and help to mitigate climate change.

Hereinafter, the present disclosure will be described in more detail with reference to the Examples and Comparative Examples. However, the following Examples and Comparative Examples are only an example for describing the present disclosure in more detail, and do not limit the present disclosure in any way.

The physical properties of the following examples and comparative examples were measured by the following methods.

[Method of Evaluating Physical Properties]

1. Density [$g/cm^3$]: after a calibration curve of density values with height based on a standard specimen with known density was created in a linear density gradient tube using a vertical column, a specimen prepared in the examples was floated in the column, a height at which the specimen stopped was recorded, which was compared with the calibration curve, and the density of the specimen was recorded.

2. Molecular weight (Mw, Mn) [g/mol]: GPC (Agilent, Infinity 1260) was used to measure a weight average molecular weight (Mw) and a number average molecular weight (Mn). A GPC column temperature was 160° C. A solvent used was trichlorobenzene, a standard was polystyrene, and analysis was performed at room temperature at a flow rate of 1 mL/min. In addition, a polydispersity index (PDI) value was calculated from Mw and Mn. Other specific conditions are as follows.

Analysis instrument: a GPC system (model name: 1260 Infinity II High-Temperature GPC System available from Agilent) to which three columns (model name: PLgel Olexis available from Agilent 7.5×300 mm, 13 µm) and one guard column (model name: PLgel Olexis available from Agilent 7.5×300 mm, 13 µm) were connected, which were set at a temperature of 160° C. and at a GPC flow rate of 1 mL/min, and a refractive index detector was connected was used.

Preparation of sample: 2 to 5 mg of samples were dissolved using 1 M 1,2,4-trichlorobenzene of 200 ppm of BHT. At this time, the samples were prepared by stirring at 150° C. for 4 hours using a preprocessor (Agilent PL-SP 260 VS Sample Preparation System), 200 µL of the produced solution was injected to GPC, and analysis was performed.

3. Melt flow index (MI) [g/10 min]: Melt flow index (MI) was measured in accordance with ASTM D1238, as grams eluted per 10 minutes (g/10 min) under the condition of 190° C., 2.16 kg, and high load melt flow index (HLMI) was measured as grams eluted per 10 minutes (g/10 min) under the condition of 190° C., 21.6 kg.

4. Tensile strength at yield and elongation (at break) [kgf/cm², %]: measured in accordance with ASTM D638, specifically, measured under the speed condition of 50 ram/min, after conditioning a specimen having a thickness of 2.0 mm under the temperature condition of 23±2° C. and the humidity environment of 50% for 40 hours.

5. Izod impact strength [kJ/m²]: in accordance with ASTM D256, a specimen was manufactured under the conditions of Dimension A (10.16±0.05 mm), was conditioned under the temperature condition of 23° C. and the humidity environment of 50% for 40 hours, and then the Izod impact strength at room temperature was measured at a temperature of 23±2° C.

6. Flexural strength [kgf/cm²]: a specimen was conditioned in the temperature condition of 23° C. in a humidity environment of 50% for 40 hours, and the flexural strength was measured in accordance with the Procedure condition B (0.1 mm/mm/min) of ASTM D790.

7. Environmental stress crack resistance (ESCR) [hour]: measured in accordance with Condition B, F50 (bath temperature: 50° C.) of ASTM D1693.

8. Inorganic content [wt %]: 5 to 10 mg of the samples prepared in the examples were placed in an aluminum pan using TGA (Discovery TGA, Waters Pacific Pte) and were heated to 700° C. at a rate of 10° C./10 min under a nitrogen atmosphere, and then the temperature was raised to 900° C. in an air condition to remove organic materials inside. A ratio of the residual weight of the sample after heating to the weight of the sample before heating was calculated, and is shown in the following table as a ceramic content.

Preparation Example 1

A sample of a waste separator with an inorganic coating in a film form was prepared, and the ceramic content of the sample was measured as 60 wt %. Since it was not able to be processed alone, separate physical properties were not able to be evaluated.

Preparation Example 2

A waste separator sample before inorganic coating (or after inorganic removal) was crushed into a size of 5 cm×5 cm or less, a pellet was obtained by an extruder at a processing temperature of 230° C. and was sufficiently dried to prepare a waste high-density polyethylene pellet without an inorganic coating of Preparation Example 1, and the physical properties were measured and are shown in the following Table 1.

In Preparation Examples 1 and 2, as the waste separator sample, a sample recovered from waste secondary batteries and secondary battery defective products, and scraps produced in the secondary separator manufacturing process using a high-density polyethylene as a raw material or the separator end sample recovered after trimming were used.

Examples 1 to 7, and Comparative Examples 1 and 2

Considering the inorganic content of Preparation Example 1, the waste high-density polyethylene without an inorganic coating of Preparation Example 2 and new high-density polyethylenes (A to F) having the physical properties of the following Table 1 were added according to the contents of the following Table 2 to prepare polymer compositions. The polymer compositions were input to an internal mixer having a 350 cc size available from Brabender, were melt kneaded at a processing temperature of 200° C. at 40 rpm for 5 minutes, and then were manufactured into a sheet form by a compression press and crushed to prepare pellets for molding. The pellets for molding were injected or compression molded to prepare specimens appropriate for each physical property evaluation standard, and the values of the following Calculation 1 and the physical properties described above were measured and are shown in the following Tables 1, 3, and 4:

$$\log(MI_1) + 2 \times \log(MI_2) \quad \text{[Calculation Formula 1]}$$

wherein $MI_1$ and $MI_2$ are as described above in Equation 1.

TABLE 1

|  | Preparation Example 1 | Preparation Example 2 | A | B | C | D | E | F |
|---|---|---|---|---|---|---|---|---|
| MI | 0.02 | 0.02 | 0.35 | 1 | 0.05 | 1 | 0.18 | 5.5 |
| [Calculation Formula 1] | — | — | −2.6 | −1.7 | −4.3 | −1.7 | −3.2 | −0.22 |

TABLE 1-continued

|  | Preparation Example 1 | Preparation Example 2 | A | B | C | D | E | F |
|---|---|---|---|---|---|---|---|---|
| HLMI | 2 | 2 | — | — | 10 | — | — | — |
| Density | 2.0 | 0.952 | 0.958 | 0.965 | 0.953 | 0.955 | 0.961 | 0.960 |
| Tensile strength at yield | — | 230 | 280 | 240 | 260 | 250 | 309 | 270 |
| Elongation | — | 700 | >700 | 500 | >700 | >500 | >700 | >500 |
| Flexural strength | — | 9200 | 9500 | 12000 | 9180 | 9500 | 11,400 | 9200 |
| Impact strength | — | >60 | 15 | 8 | 20 | 15 | 11 | 9 |
| ESCR | — | 150 | >600 | 13 | >1000 | >600 | >300 | 4 |

A (YUZEX 2520, SK Chemicals Co., Ltd.)
B (YUZEX 7300, SK Chemicals Co., Ltd.)
C (YUZEX 6100, SK Chemicals Co., Ltd.)
D (YUZEX 7302, SK Chemicals Co., Ltd.)
E (YUZEX 2600S, SK Chemicals Co., Ltd.)
F (YUZEX 7210, SK Chemicals Co., Ltd.)

TABLE 2

| (wt %) | Preparation Example 1 | Preparation Example 2 | A | B | C | F |
|---|---|---|---|---|---|---|
| Example 1 | 30 | | 70 | | | |
| Example 2 | 10 | 20 | 70 | | | |
| Example 3 | 30 | | | 70 | | |
| Example 4 | 16 | 22 | | 62 | | |
| Example 5 | 5 | 30 | | 65 | | |
| Example 6 | 30 | | | | 70 | |
| Example 7 | 10 | 20 | | | 70 | |
| Comparative Example 1 | 50 | | | 50 | | |
| Comparative Example 2 | 30 | | | | | 70 |

TABLE 3

|  | Waste separator content [wt %] | Inorganic content [wt %] | MI (2.16 kg) [g/10 min] | HLMI (21.6 kg) [g/10 min] | Density [g/cm³] |
|---|---|---|---|---|---|
| Example 1 | 30 | 18 | 0.27 | 25 | 1.11 |
| Example 2 | 30 | 6 | 0.14 | 12 | 1.00 |
| Example 3 | 30 | 18 | 0.27 | 31 | 1.15 |
| Example 4 | 38 | 10 | 0.20 | 18 | 1.04 |
| Example 5 | 35 | 3 | 0.19 | 16 | 0.98 |
| Example 6 | 30 | 18 | 0.05 | 9 | 1.10 |
| Example 7 | 30 | 6 | 0.06 | 9.4 | 0.98 |
| Comparative Example 1 | 50 | 30 | Impossible to blend | | |
| Comparative Example 2 | 30 | 18 | 2.4 | — | 1.23 |

TABLE 4

|  | Tensile strength at yield [kgf/cm²] | Elongation [%] | Flexural strength [kgf/cm²] | Impact strength [kg/m²] | ESCR [hour] |
|---|---|---|---|---|---|
| Example 1 | 236 | 32 | 11600 | 5 | >300 |
| Example 2 | 257 | 360 | 10000 | 12 | >300 |
| Example 3 | 273 | 7 | 17000 | 3.5 | 20 |
| Example 4 | 247 | 700 | 11000 | 10 | 30 |
| Example 5 | 270 | 500 | 10300 | 11 | 40 |
| Example 6 | 232 | 39 | 12100 | 15 | >300 |
| Example 7 | 243 | 800 | 12100 | 20 | >300 |
| Comparative Example 2 | 276 | 4 | 15400 | 2.4 | <1 |

As shown in Tables 3 and 4, the polymer compositions according to the examples, though including 30 wt % or more of the waste high-density polyethylene comprising the waste separator with the inorganic coating, had a melt flow index preferred in a blow molding process to implement excellent processability, mechanical properties such as elongation, tensile strength at yield, impact strength, and flexural strength preferred in a blow molded article, and effectively implemented environmental friendliness.

In addition, it was found from Comparative Example 1 that when the inorganic content was 30 wt % or more, it was difficult to proceed with processing, and it was found from comparison of Comparative Example 2 and Examples 1 and 3 that a polymer composition using a new high-density polyethylene having a melt flow index of 0.01 to 5 g/10 min showed a melt flow index preferred in a blow molding process.

In particular, it was confirmed from comparison of Examples 3, 4, and 5 that when the inorganic content derived from the waste separator with the inorganic coating was 3 to 10 wt %, better physical properties were shown, and it was confirmed from Examples 6 and 7 that better processability was implemented in a range of the melt flow index of the new high-density polyethylene of 0.1 to 2 g/10 min.

Example 8

12 kg of a waste separator with a ceramic coating of Preparation Example 1 and 28 kg of a waste separator without a ceramic coating of Preparation Example 2 were input to an 80 L Banbury mixer, melt kneaded under the conditions of a temperature of 90° C. and 65 rpm for about 3 minutes, and then extruded with a 250T single screw extruder to prepare a first pellet. Subsequently, the first pellet and UZEX 2600S were input at a ratio of 1:1 to the same mixer, melt kneaded under the conditions of a temperature of 90° C. and 65 rpm for about 5 minutes, and then extruded with a single screw extruder to prepare a pellet for molding. The pellet for molding was injected or extruded to prepare a specimen appropriate for each physical property evaluation standard, and the physical properties were measured and are shown in the following Table 5.

Example 9

10 kg of a waste separator with a ceramic coating of Preparation Example 1, 20 kg of a waste separator without a ceramic coating of Preparation Example 2, and 10 kg of YUZEX 7302 were input to an 80 L Banbury mixer, melt kneaded under the conditions of a temperature of 90° C. and 65 rpm for about 3 minutes, and then extruded with a 250T single screw extruder to prepare a first pellet. The rest of the process was performed in the same manner as in Example 8, a specimen appropriate for each physical property evaluation standard was prepared, and the physical properties were measured and are shown in the following Table 5.

TABLE 5

| | Waste separator content [wt %] | Inorganic content [wt %] | MI (2.16 kg) [g/10 min] | Density [g/cm$^3$] | Elongation [%] | Flexural strength [kgf/cm$^2$] | Impact strength [kg/m$^2$] |
|---|---|---|---|---|---|---|---|
| Example 8 | 50 | 9 | 0.1 | 1 | 800 | 10100 | 30 |
| Example 9 | 37.5 | 7.5 | 0.1 | 1 | 860 | 10600 | 21 |

As shown in Table 5, the polymer compositions of Examples 8 and 9 may actively improve environmental friendliness in that the waste separator may be recycled more economically and easily by preparing the pellet for molding using a Banbury mixer, and mechanical properties such as melt flow index, elongation, flexural strength, and impact strength which are more preferred in blow molding may be achieved by properly adjusting the inorganic content to a weight ratio of the waste separator with a ceramic coating of Preparation Example 1 and the waste separator without a ceramic coating in a range of 1:2 to 2.5. In addition, it was confirmed from an additional experiment that it was difficult to perform the melt kneading operation of only the waste separator with a ceramic coating of Preparation Example 1.

Evaluation Example

Blow molding was performed using the pellets for molding prepared in the examples, and blow molded articles having 1.5 L and 18 L sizes were manufactured therefrom. As the evaluation items of the blow molded articles, appearance of the molded article, top load strength [kgf/cm$^2$], environmental stress crack resistance (ESCR), a loading test, and a drop test were performed, and the results are shown in Table 6.

At this time, the appearance of the molded article was evaluated as follows:
the surface was smooth and glossy: good (◉), the surface was smooth but not glossy: normal (Δ), the surface was bumpy and had palpable external protrusion: poor (x)
In addition, the upper load strength was measured as the crush yield properties of a container by UTM in accordance with ASTM D2659. The ESCR of the container was evaluated as follows: for the 1.5 L small container, in accordance with ASTM D5571, the inside of the container was filled with a 10% Igepal aqueous solution, a weight of 4.5 kg was placed on each container in an oven at 50° C., and whether the aqueous solution leaked was evaluated for 14 days, and for the 18 L container, the container was maintained for 30 minutes under a water pressure of 20 kPa to determine whether the aqueous solution leaked, and Pass or Fail was indicated depending on whether there was a leak. The loading test was performed by loading 4 stacks of the containers filled with the content, storing the containers for 2 weeks, and evaluating whether the containers were crushed and the content leaked. The drop test was performed by filling the container halfway or more with water, dropping the container from a height of 4 M, and evaluating whether the content leaked, and Pass or Fail was indicated.

TABLE 6

| Use resin | Manufacturing container | Appearance | Top load strength | Container ESCR | Loading test | Drop test |
|---|---|---|---|---|---|---|
| Example 4 | 1.5 L | ◉ | 57 kgf | Pass | Pass | Pass |
| Example 5 | 1.5 L | ◉ | 55 kgf | Pass | Pass | Pass |
| Example 8 | 18 L | Δ | 315 kgf | Pass | Pass | Pass |
| Example 9 | 18 L | ◉ | 320 kgf | Pass | Pass | Pass |
| E (2600S) | 18 L | ◉ | 330 kgf | Pass | Pass | Pass |

As shown in Table 6, the molded articles manufactured by blow molding the polymer compositions of the examples showed equivalent or similar physical properties to those of the high-density polyethylene product (2600S) commonly used in blow molding in that the molded articles had good appearance and excellent top load strength and environmental stress crack resistance properties, and passed the standards of the loading test and the drop test. However, when the polymer composition of Comparative Example 2 was used, moldability was insignificant, and thus, it was impossible to manufacture a container.

Thus, it was confirmed that the polymer composition for blow molding prepared according to an exemplary embodiment, though including a certain content or more of the waste separator with an inorganic coating, had a melt flow index preferred in blow molding to have excellent processability, and the article product manufactured therefrom may effectively implement excellent mechanical properties and environmental friendliness.

The present disclosure relates to a polymer composition for blow molding comprising a waste separator with an inorganic coating, and specifically, the polymer composition for blow molding according to an exemplary embodiment comprises a new high-density polyethylene satisfying certain conditions and has an inorganic content satisfying a certain content with respect to the total weight of the polymer composition, and thus, though comprising a certain content or more of the waste high-density polyethylene, it has a melt flow index preferred in blow molding and may show excellent mechanical properties such as elongation, flexural strength, and impact strength. A molded article manufactured by blow molding the polymer composition has excellent moldability, appearance quality, top load strength, and environmental stress crack resistance properties, and furthermore, may show quality at or higher than evaluation standards of a load test or a drop test, and may be widely used in various industrial fields with excellent mechanical properties and environmental friendliness.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A polymer composition for blow molding, comprising: a waste high-density polyethylene comprising a waste separator with an inorganic coating; and a new high-density polyethylene having a melt flow index of 0.01 to 5 g/10 min as measured in accordance with ASTM D1238 (190° C., 2.16 kg),
wherein an inorganic content derived from the waste separator with the inorganic coating is 20 wt % or less with respect to the total weight of the polymer composition for blow molding, and
wherein the waste high-density polyethylene has a high load melt flow index ($HLMI_1$) of 0.1 to 7.0 g/10 min as measured in accordance with ASTM D1238 (190° C., 21.6 kg).

2. The polymer composition for blow molding of claim 1, wherein the inorganic content derived from the waste separator with the inorganic coating is 3 to 10 wt % or less with respect to the total weight of the polymer composition for blow molding.

3. The polymer composition for blow molding of claim 2, wherein the waste high-density polyethylene further comprises a waste separator without an inorganic coating, and
the waste separator without an inorganic coating is input to adjust an inorganic content of the polymer composition for blow molding.

4. The polymer composition for blow molding of claim 2, wherein a melt flow index of the waste high-density polyethylene ($MI_1$) and a melt flow index of the new high-density polyethylene ($MI_2$) satisfy the following Equation 1, and the melt flow index is measured in accordance with ASTM D1238 (190° C., 2.16 kg):

$$-4.3 \leq \log(MI_1) + 2 \times \log(MI_2) \leq -0.9. \quad \text{[Equation 1]}$$

5. The polymer composition for blow molding of claim 4, wherein the waste high-density polyethylene has the melt flow index ($MI_1$) of 0.005-0.10 g/10 min as measured in accordance with ASTM D1238 (190° C., 2.16 kg).

6. The polymer composition for blow molding of claim 4, wherein the new high-density polyethylene has the melt flow index ($MI_2$) of 0.1 to 2 g/10 min as measured in accordance with ASTM D1238 (190° C., 2.16 kg).

7. The polymer composition for blow molding of claim 3, wherein the waste separator with the inorganic coating and the waste separator without the inorganic coating satisfy a weight ratio of 1:0.1 to 10.

8. The polymer composition for blow molding of claim 1, wherein the waste high-density polyethylene is included at 30 to 50 wt % with respect to the total weight of the polymer composition for blow molding.

9. The polymer composition for blow molding of claim 1, wherein the waste high-density polyethylene and the new high-density polyethylene satisfy a weight ratio of 1:1 to 3.

10. The polymer composition for blow molding of claim 1, wherein the waste separator is any one or two or more waste separators selected from waste separators recovered from waste secondary batteries and secondary battery defective products, scraps produced in a secondary battery separator manufacturing process, and separator ends recovered after trimming.

11. The polymer composition for blow molding of claim 1, wherein the polymer composition for blow molding has a melt flow index ($MI_3$) of 0.05 to 1.0 g/10 min as measured in accordance with ASTM D1238 (190° C., 2.16 kg).

12. The polymer composition for blow molding of claim 1, wherein the polymer composition for blow molding has a tensile strength at yield of 220 kg/cm$^2$ or more and an elongation of 300% or more.

13. The polymer composition for blow molding of claim 12, wherein the polymer composition for blow molding has an Izod impact strength of 10 KJ/m$^2$ or more as measured at a temperature of 23±2° C. and a flexural strength of 9,000 kgf/cm$^2$ or more.

14. The polymer composition for blow molding of claim 12, wherein the polymer composition for blow molding has environmental stress crack resistance of 10 hours or more as measured in accordance with ASTM D1693.

15. A molded article manufactured by blow molding the polymer composition for blow molding of claim 1.

* * * * *